Aug. 12, 1924.

O. J. STREETER ET AL 1,504,583

HYDRAULIC TRANSMISSION AND CLUTCH MECHANISM

Filed Nov. 15, 1921      2 Sheets-Sheet 1

INVENTOR
OSCAR J. STREETER
NOBLE M. STREETER
BY Chas. E. Townsend.

ATTORNEY

Aug. 12, 1924.

O. J. STREETER ET AL 1,504,583

HYDRAULIC TRANSMISSION AND CLUTCH MECHANISM

Filed Nov. 15, 1921    2 Sheets-Sheet 2

INVENTOR
OSCAR J. STREETER
NOBLE M. STREETER
BY
Chas. E. Townsend.

ATTORNEY

Patented Aug. 12, 1924.

1,504,583

UNITED STATES PATENT OFFICE.

OSCAR J. STREETER AND NOBLE M. STREETER, OF STOCKTON, CALIFORNIA.

HYDRAULIC TRANSMISSION AND CLUTCH MECHANISM.

Application filed November 15, 1921. Serial No. 515,275.

*To all whom it may concern:*

Be it known that we, OSCAR J. STREETER and NOBLE M. STREETER, citizens of the United States, residing at Stockton, in the county of San Joaquin and State of California, have invented new and useful Improvements in Hydraulic Transmission and Clutch Mechanism, of which the following is a specification.

This invention relates to a transmission and clutch mechanism of the hydraulic type.

The object is to provide for necessary variations in speed, both forward and reverse, including neutral or inoperative positions, by means of a simple unitary structure which shall be devoid of the usual shiftable gears, and being capable of complete control through a single lever.

To attain this object we make use of a differential gearing between the drive shaft and the driven shaft and provide a revoluble casing around the differential gearing to form an inclosure for incompressible fluid. Within the casing we arrange a novel form of pumping mechanism which is operatively connected with the compensating gears in the differential mechanism and provide controlling means for the pumping mechanism whereby a variable resistance can be applied to the pumping mechanism such that the compensating gears will be affected in a manner to impart forward, neutral and reverse speeds to the driven shaft.

One form which our invention may assume is exemplified in the following description and illustrated in the accompanying drawings, in which.

Figure 1:
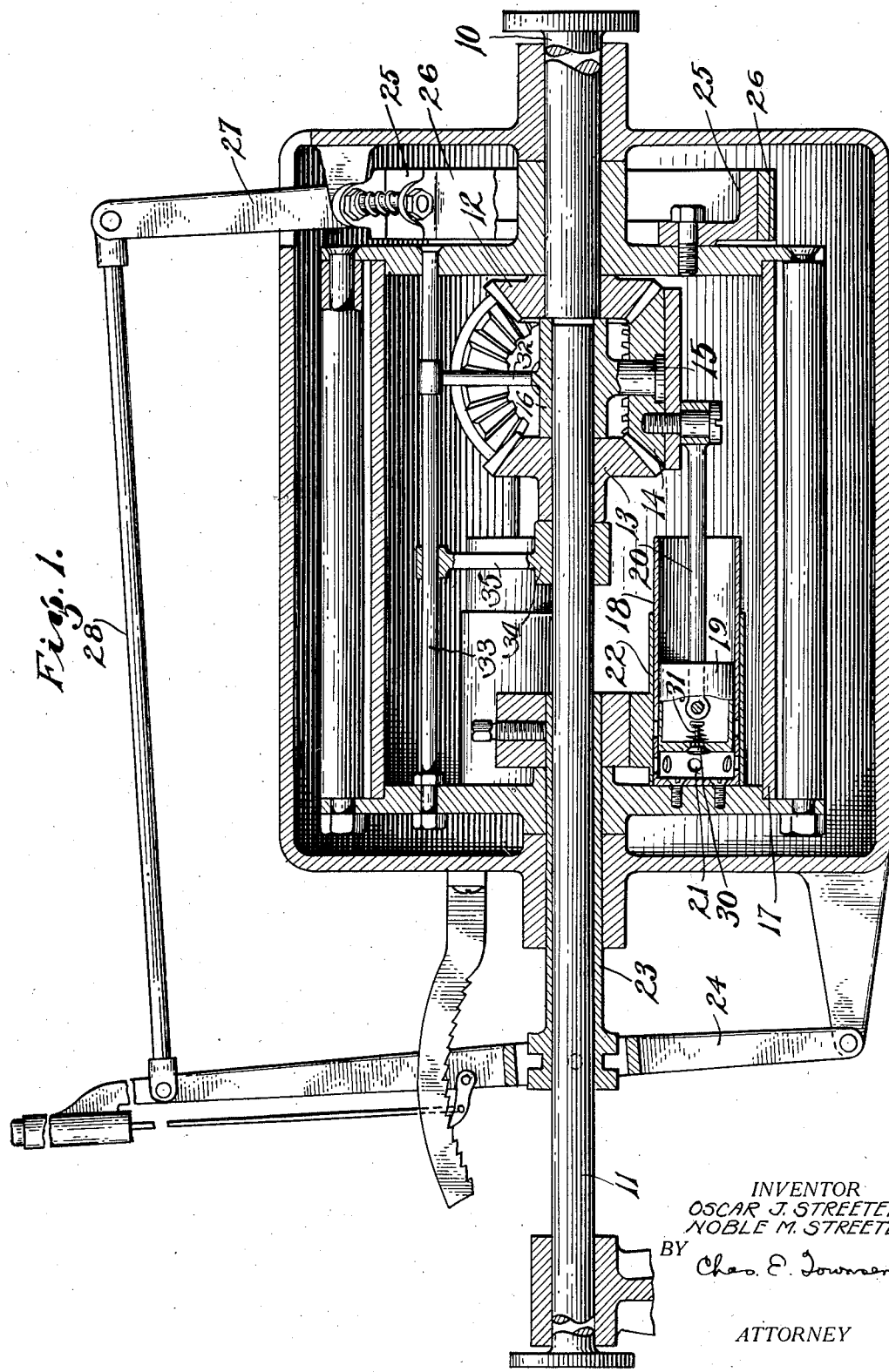
Fig. 1 shows a longitudinal central sectional view of a transmission structure embodying our invention.

Referring in detail to the accompanying drawings, we show a driving shaft 10 and an aligned driven shaft 11. Between and connecting the shafts is a differential mechanism, preferably of the beveled gear type, and consisting of a beveled gear 12 fixed upon the driving shaft, a beveled gear 13 fixed upon the driven shaft and compensating gears 14 intermeshed with the gears 12 and 13. The said compensating gears are journaled upon studs 15 and the studs are carried upon a sleeve 16 which is freely rotatable upon and between the shafts 10 and 11.

Surrounding the differential mechanism is an inclosed barrel or casing 17 having one end journaled rotatably upon the drive shaft 10 and the other end journaled rotatably upon the driven shaft 11. This casing or barrel is designed to contain fluid of an incompressible nature such as oil. Inside the casing and fixed to one end thereof are a plurality of cylinders 18 open at one end and fitted each with a piston 19. By means of a connecting rod 20 each piston is coupled to the adjacent compensating gear 14. Each cylinder near its head is provided with ports 21 over which works a sleeve valve 22. All of the sleeve valves are connected to an actuating sleeve 23 slidably mounted upon the driven shaft and operated by a controlling lever 24, the latter being outside the casing.

The casing or barrel at one end carries a brake drum 25, and on this drum is arranged a brake band 26 which is actuated by a cam and rock arm 27. The rock arm is preferably connected to the control lever 24 by means of a rod 28.

In operation of this device the barrel or casing is entirely filled with noncompressible fluid. The size and number of cylinders and the arrangement of the ports are such that when all of the ports are covered by the sleeve valves the fluid cannot circulate through the cylinders, and therefore the pistons will be held against reciprocating movement. In consequence of this the compensating gears 14 cannot rotate on their studs 15, and therefore the entire mechanism, including the casing 17, will revolve in unison, imparting a direct speed forward drive to the driven shaft. By uncovering some of the ports fluid will circulate through the cylinders somewhat and the pistons therefore will reciprocate slightly. This will allow the compensating gears 14 to turn to some extent upon their studs 15, thereby imparting a reduced forward speed to the driven shaft. By uncovering the ports still further the pistons will be allowed to reciprocate to such an extent as to permit the compensating gears 14 to turn on their own individual axes a sufficient amount to allow the beveled gear 13 on the driven shaft to remain idle, the casing meanwhile being carried around by the revolution of the compensating gears about the axis of the driving gear 12. This constitutes a neutral or inoperative position of the driven shaft 11. If now the ports be still further uncovered and the brake applied to the casing or barrel, the revolution of the latter will be slowed down and in consequence the beveled gear 13 on the driven shaft will be turned in a reverse direction. The speed of the reverse drive can be increased by uncovering the ports still further to give greater freedom to the reciprocation of the pistons and applying sufficient braking pressure to the barrel or casing to stop its revolution entirely.

A transmission structure of this nature, owing to its simplicity and its great variety of speeds, is ideally suited for marine purposes, although obviously it may be used in any situation where a variable speed and reverse transmission mechanism is required.

The number of cylinders within the casing, and the location and size of the ports in the cylinder walls can be varied to suit the requirements. Various other changes in the construction and arrangements of the several parts herein shown and described may be employed without departing from the spirit of our invention as disclosed in the appended claim.

We preferably provide a valve 30 in the head of each piston, said valve opening inwardly towards the head of the cylinder and being normally held seated by means of a spring 31. The purpose of this valve is to admit oil into the space between the piston and the cylinder heads in event said space should become emptied as a result of leakage during the time the piston is held stationary with the sleeve valve closed as shown in Fig. 1. Should this space become emptied the piston would fail to pump oil and would be operating on vacuum or partial vacuum within the cylinder.

Figure 2:
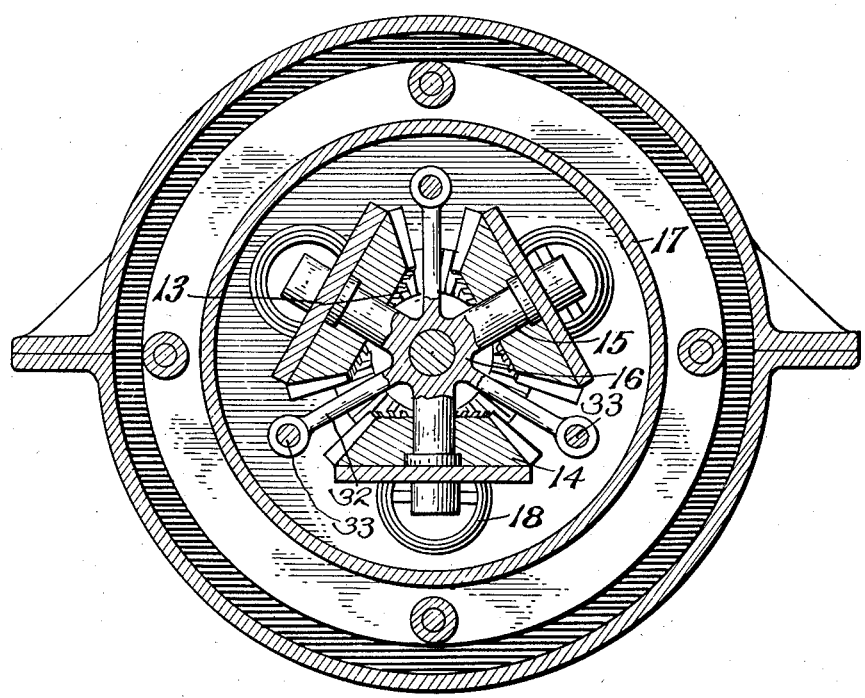
Fig. 2 shows a transverse sectional view of the same taken on the line 2—2 of Fig. 1.

The sleeve 16, as shown in Fig. 2, carries radial arms 32 extending out between each pair of compensating gears 14 and connected to the longitudinal rods 33, which extend from end to end of the casing 17. A bearing 34 is provided for the inner end of the driven shaft and this is supported by a spider 35 connected with the rods 33.

Having thus described our invention, what we claim and desire to secure by Letters Patent is:

In a transmission mechanism, a drive shaft, a driven shaft, differential gear mechanism connecting said shafts together, a revoluble casing journaled at one end on the driven shaft and at the other end on the drive shaft, said casing surrounding the differential mechanism and forming an inclosure for uncompressible fluid, a cylinder fixed in the casing parallel to said drive shaft, a piston within the cylinder and operatively connected to a compensating gear of said differential mechanism, said cylinder being provided with ports to permit fluid to be pumped therethrough, a sleeve valve slidable on said cylinder to control said ports, whereby the resistance to the movement of fluid through said cylinder may be varied in a manner to affect said compensating gear and bring about a change in the movement of the driven shaft with relation to the drive shaft, a brake drum fixed on the casing, a brake band associated therewith to affect the operation of the casing, an actuating sleeve on the drive shaft slidable through the journal of the casing and operatively connected to the sleeve valve, a controlling lever operatively connected to said sleeve and said brake band for simultaneously actuating said valve and said brake.

OSCAR J. STREETER.
NOBLE M. STREETER.